No. 668,623. Patented Feb. 26, 1901.
T. H. BOWLES.
ALARM MECHANISM.
(Application filed Jan. 11, 1900. Renewed Nov. 1, 1900.)
(No Model.)
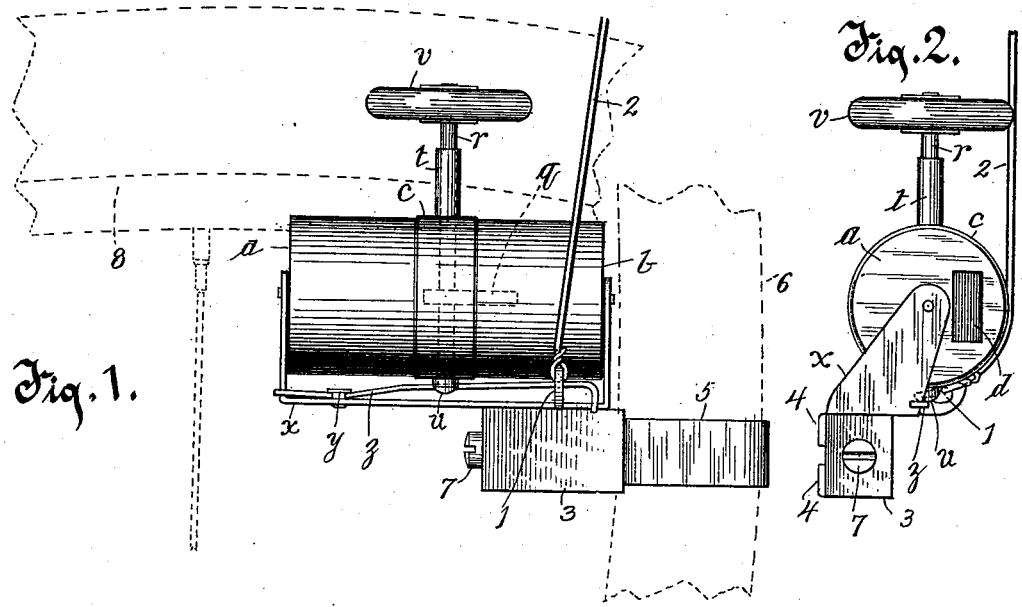
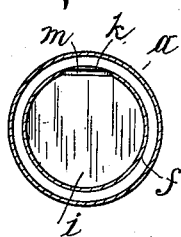
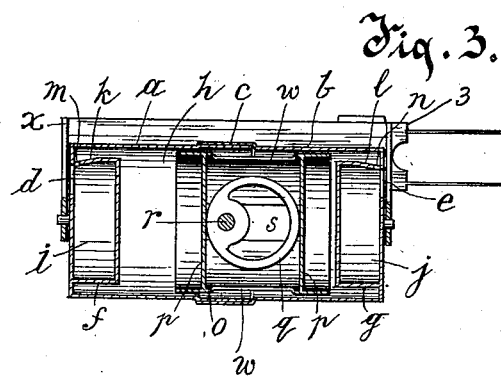
Witnesses.
O. N. Keeney
Anna V. Faust
Inventor.
Thomas H. Bowles
By Benedict and Morsell
Attorneys.

UNITED STATES PATENT OFFICE.

THOMAS H. BOWLES, OF MILWAUKEE, WISCONSIN.

ALARM MECHANISM.

SPECIFICATION forming part of Letters Patent No. 668,623, dated February 26, 1901.

Application filed January 11, 1900. Renewed November 1, 1900. Serial No. 35,112. (No model.)

*To all whom it may concern:*

Be it known that I, THOMAS H. BOWLES, of Milwaukee, in the county of Milwaukee and State of Wisconsin, have invented a new and useful Improvement in Alarm Mechanism, of which the following is a description, reference being had to the accompanying drawings, which are a part of this specification.

My invention has relation to improvements in alarm mechanism. It has particular reference to alarm mechanism of that class wherein a friction-roller is employed which is so located that when the operating mechanism is actuated the said roller is thrown into contact with the periphery of the wheel of a bicycle or other vehicle or the revolving part of other mechanism to which the alarm mechanism is adjusted and the alarm thereby sounded.

The primary object of the invention is to provide an improved construction and arrangement for promoting the general efficiency of devices of this character, whereby convenience, simplicity, and cheapness in construction are secured.

A further object resides in providing an improved and simple form of mechanism for turning the casing of the alarm so as to throw the friction-roller into contact with the periphery of the wheel and for returning said casing of the alarm mechanism to the normal position, in which the friction-roller is out of contact with the periphery of the wheel.

With the above and other incidental objects in view the invention consists of the devices and parts or their equivalents, as hereinafter more fully set forth.

In the accompanying drawings, Figure 1 is an elevation of my invention, the view showing in dotted lines a fragment of the front fork of a bicycle and a fragment of the front wheel of a bicycle in order to clearly illustrate the application and operation of the invention. Fig. 2 is an end elevation of the alarm mechanism. Fig. 3 is a longitudinal sectional view of the alarm mechanism. Fig. 4 is an end elevation of Fig. 3, with the end piece of the casing removed. Fig. 5 is a side elevation of the clamping mechanism, and Fig. 6 is a view at right angles to Fig. 5.

The casing of the improved alarm mechanism is preferably composed of two sections, (designated, respectively, by the letters $a$ and $b$.) Section $b$ has a raised portion $c$ at its inner end, forming a socket, in which the inner end of the section $a$ fits, the connection being detachable to permit one section to be readily withdrawn from the other, so that access to the interior parts may be afforded at all times. The opposite extremities of the casing are provided with openings, the opening at one end being designated by the letter $d$ and the opening at the opposite end by the letter $e$. Within the main casing, at opposite ends thereof, are arranged auxiliary casings $f$ and $g$, respectively, said auxiliary casings being of such less diameter than the main casing as to form annular passages around said auxiliary casings, which annular passages are in communication with the main chamber $h$ of the outer casing. The auxiliary casings form whistle-chambers $i$ and $j$, respectively, and the openings $d$ and $e$ at the opposite ends of the main casing lead into these chambers. A flat surface is formed on the annular rim of each auxiliary casing, the flat surface of the casing $f$ being indicated by the letter $k$ and the flat surface of the casing $g$ by the letter $l$. The flat surface $k$ has an opening $m$ therein, which places the annular space around the casing $f$ into communication with the whistle-chamber $i$, and the flat surface $l$ is provided with an opening $n$, which places the annular space around the casing $g$ into communication with a whistle-chamber $j$.

Within the main chamber $h$ of the outer casing is adapted to reciprocate a piston, which in my improved form of construction consists of a cylindrical body portion $o$, having the connecting end pieces $p$ $p$. Located within the cylindrical piston and between the two end pieces thereof is an actuating device consisting of a ring or disk $q$, eccentrically mounted on a spindle $r$. This spindle extends through diametrically opposite slots $s$ in the cylinder, and one end of the spindle is extended out beyond the outer side of the outer casing, being journaled at that side in a sleeve $t$, projecting outwardly from the casing. The opposite end of the spindle is journaled in a projecting bearing $u$. On the outer extremity of the spindle is mounted a friction-wheel $v$. The cylindrical portion of the piston is also provided with two other diametrically-located slots w w, into which slots the eccentric passes in its revolution, the said slots thereby preventing the eccentric from binding against the sides of the casing.

Pivoted to opposite ends of the outer casing are the projecting arms of a yoke x. Extending from the horizontal arm of this yoke is a stud or projection y. A spring-rod z is arranged with one end against one of the arms of the yoke and is then extended longitudinally along the horizontal arm of the yoke and back of the projection or stud y and thence through an eye 1, extending from the outer casing, the extremity of the rod being bent at an angle, so as to bring said extremity into engagement with the edge of the horizontal portion of the yoke, as most clearly shown in Fig. 1. A cord or other device 2 is connected to the eye 1 and is extended upwardly for connection to a lever (not shown) or other suitable device for operating the cord.

Rigid with the under side of the horizontal member of the yoke is a socket 3, said socket having one end open and one end closed. One of the sides of the socket is also preferably removed, and from the top and bottom edges of the socket at this open side extend toward each other two guide-lugs 4 4.

The numeral 5 indicates a clamp consisting of sheet metal bent into approximate U form. This clamp is adapted to embrace any fixed portion of the vehicle or other mechanism to which the alarm is attached. In the case of a bicycle it embraces one of the members of the front fork of the bicycle, as shown in Fig. 1, the front fork being shown in said figure by dotted lines and indicated by the numeral 6. The ends of the clamp are bent inwardly at right angles in position to lap each other, the said inwardly-bent ends being provided with screw-threaded openings which are adapted to be brought into register with each other. When the clamp is adjusted to position around one of the fork members of a bicycle or around a fixed portion of any other mechanism to which the device is applied, the angularly-bent ends of the clamp are forced together and then passed into the open end of the socket, the lugs 4 4 serving not only as guides, but also serving to force the ends of the clamp together, so that the screw-threaded openings in the bent ends of said clamp will be brought into register. When the clamp is thus inserted in place in the socket, it is adjusted tightly around the part which it clamps by means of a screw 7, which passes through an opening in the closed end of the socket and engages the registering screw-threaded openings in the bent ends of the clamp.

In the operation of my invention whenever it is desired to sound the alarm the operating-cord is pulled upwardly, and this has the effect of turning the outer casing inwardly on the end pivots of the yoke, so as to throw the friction-wheel v into contact with the periphery of the wheel 8 of the bicycle or other vehicle or into contact with the revolving part of any other mechanism to which the alarm is applied. This will of course cause a rotation of the friction-wheel and its spindle and a consequent rotation of the eccentric. The eccentric will of course in its revolution contact with opposite ends of the piston, and thereby cause a rapid reciprocation of said piston. As the piston is thus reciprocated the air will be alternately forced from the main chamber through the openings m or n, in accordance with the direction of the movement of the piston, thence into the whistling-chamber and out of the opening at the end of the outer casing, and thereby produce a whistling sound. When the operating-cord is released, the retractile power of the spring-rod z will of course return the casing to a normal position, in which the friction-wheel is out of contact with the revolving part, the eye 1 forming a stop which contacts with the edge of the yoke x, and thereby limits the return movement of the casing. The cylindrical connection for the end pieces of the piston provides a rigid and strong connection between said end pieces without danger of the end pieces being bent or tilted by the action of the eccentric or ring thereagainst, and at the same time the free action of the eccentric or ring against said end pieces is not interfered with.

My alarm mechanism is especially adapted for application to a bicycle, but is also intended to be used in connection with automobiles and may be found of utility also in connection with other devices having a revolving part, which the friction-wheel v may be thrown in contact with.

What I claim as my invention is—

1. In an alarm mechanism, the combination, of a casing consisting of two sections separably connected together, said casing provided interiorly with sound-producing mechanism to which access may be obtained when the sections of the casing are separated, a rotatable spindle journaled in the casing, and on which spindle the sound-producing mechanism is mounted, said spindle by its rotation adapted to produce sound, and means for rotating the spindle.

2. In an alarm mechanism, the combination, of a casing having a main chamber, and auxiliary whistling-chambers at opposite ends of and in communication with the main chamber through orifices, and also in communication with the outer air through orifices in the ends of the casing, a piston within the main chamber of the casing, said piston consisting of a cylindrical body portion and connecting end pieces, a disk or ring located in the cylindrical body portion of the piston and between the end pieces thereof, a spindle on which the disk or ring is eccentrically mounted, and means for rotating the spindle.

3. In an alarm mechanism, the combination, of a casing provided with sound-producing mechanism, a rotatable spindle journaled in the casing, and on which spindle the sound-producing mechanism is mounted, said spindle by its rotation adapted to produce the sound, a friction-wheel mounted on the exterior end of the spindle, a yoke mounted on a fixed part, said yoke having its arms pivotally connected to the casing, an operating device connected to the casing and adapted to turn said casing so as to throw the friction-wheel into contact with a revolving part and thereby rotate the spindle, and means, after the operating device is released, for returning the casing to the normal position in which the friction-wheel is out of contact with the revolving part.

4. In an alarm mechanism, the combination, of a casing provided with sound-producing mechanism, a rotatable spindle journaled in the casing and on which spindle the sound-producing mechanism is mounted, said spindle by its rotation adapted to produce the sound, a friction-wheel mounted on the exterior end of the spindle, a yoke mounted on a fixed part, said yoke having its arms pivotally connected to the casing, an operating device connected to the casing, and adapted to turn said casing so as to throw the friction-wheel into contact with a revolving part and thereby rotate the spindle, and a spring acting against the yoke and also against the casing, and adapted by its retractile power, after the operating device is released, to return the casing to the normal position in which the friction-wheel is out of contact with the revolving part.

5. In an alarm mechanism, the combination, of a casing provided with sound-producing mechanism, a rotatable spindle journaled in the casing and on which spindle the sound-producing mechanism is mounted, said spindle by its rotation adapted to produce the sound, a friction-wheel mounted on the exterior end of the spindle, a yoke having its arms pivotally connected to the casing, a socket rigidly connected to the yoke, a clamping device contructed to fit the socket, and said clamping device adapted to clamp the yoke to a fixed part, an operating device connected to the casing and adapted to turn said casing so as to throw the friction-wheel into contact with a revolving part and thereby rotate the spindle, and means, after the operating device is released, for returning the casing to the normal position in which the friction-wheel is out of contact with the revolving part.

In testimony whereof I affix my signature in presence of two witnesses.

THOMAS H. BOWLES.

Witnesses:
  A. L. MORSELL,
  ANNA V. FAUST.